Figure 1:
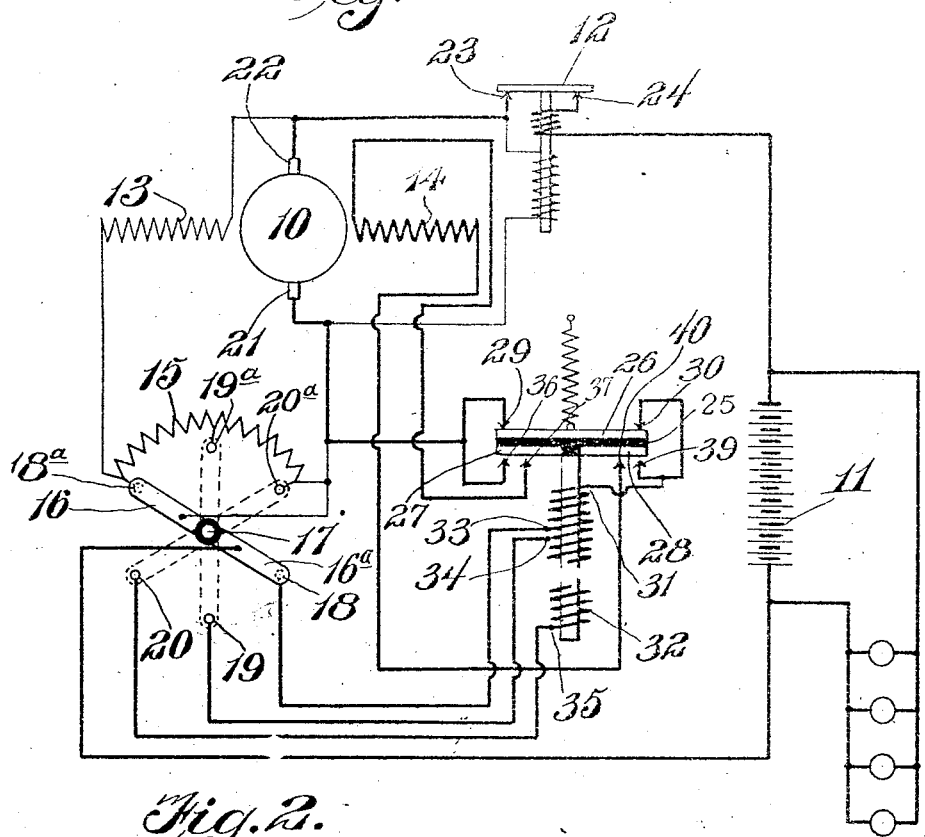

May 4, 1926.

D. J. GORE

STORAGE BATTERY SYSTEM FOR VEHICLES

Filed Dec. 2, 1924

Inventor
D. J. Gore
Watson E. Coleman
Atty

Patented May 4, 1926.

1,582,924

UNITED STATES PATENT OFFICE.

DANIEL JACK GORE, OF MOUNT PLEASANT, NORTH CAROLINA.

STORAGE-BATTERY SYSTEM FOR VEHICLES.

Application filed December 2, 1924. Serial No. 753,501.

*To all whom it may concern:*

Be it known that I, DANIEL JACK GORE, a citizen of the United States, residing at Mount Pleasant, in the county of Cabarrus and State of North Carolina, have invented certain new and useful Improvements in Storage-Battery Systems for Vehicles, of which the following is a specification, reference being had to the accompanying drawings.

This invention relates to improvements in the storage battery systems of vehicles and more particularly to a means for regulating charging of the storage battery by the generator.

An important object of the invention is to provide a system of this character in which the charging rate may be readily regulated to a desired condition of operation without necessity on the part of the operator of any practical working knowledge of electricity when a certain result is desired or a certain condition prevails which must be met.

In the storage battery systems of vehicles and particularly in the storage battery systems of automobiles, the batteries are subjected to a wide range of change in conditions of operation. The vehicle may one day be employed under conditions where short runs are made and accordingly the charging periods are short and the calls upon the battery for use in starting are frequent. Another day, the vehicle may be in use on a long trip where possibly there will be no more than one or two occasions for use of the starting motor and where the charging period will be of considerable length. Again the battery due to use or abuse may have become weakened and for this reason be inoperative for starting. It will be obvious that such conditions should be met by varied charging rates on the part of the generator of the system so that where the battery is weak a maximum charge may be supplied, where the battery is subjected to frequent uses, the charging may be continued at all times during the operating period of the vehicle and where, when there is little drain upon the battery and accordingly no call for for a charge, the charge may be reduced to a minimum and be but slightly greater than is ordinarily necessary for maintenance of operation as represented by a necessary current for ignition and occasional use of the starting motor.

An important object of this invention is the provision of a single switch mechanism, various positions of which may be indicated by suitable insignia to indicate the conditions under which the switch should be used in such position, which switch so controls the operation and output of the generator that a proper charging rate for the indicated position maintains and in combination with this switch, an automatic regulator, the operation of which is controlled from the switch.

A further object of the invention is to provide an automatic regulator for the series field of a generator employed in a storage battery system together with resistance in series with the shunt field and a common means for regulating the amount of resistance which is placed in series with the shunt field and for determining the point of operation of the regulator.

These and other objects I attain by the construction shown in the accompanying drawings, wherein for the purpose of illustration is shown a preferred embodiment of my invention and wherein:—

Figure 2:
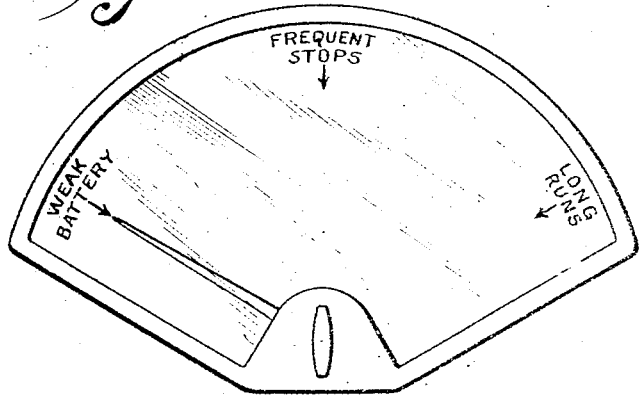

Figure 1 is a diagrammatic showing of a system in accordance with my invention; and Figure 2 is a front elevation of a controlled dial such as might be arranged upon the dash of an automobile for regulation of the vehicle by a system of this character.

Referring now more particularly to the drawings, the numeral 10 indicates the generator of the charging system, 11 the battery of the charging system and 12 the automatic regulating relay usually employed for cutting in the battery in the generator circuit when the generator circuit is built up to a proper charging voltage. The generator employed in a system constructed in accordance with my invention is supplied with both shunt and series fields indicated at 13 and 14. The shunt field has in series therewith a resistance 15 with which cooperates one arm 16 of a switch 17 having a second arm 16ª movable simultaneously with the arm 16 but insulated therefrom, this arm 16ª coacting with a series of contacts 18, 19 and 20.

The brush 21 of the generator 10 connected at that end of the shunt field circuit in which the resistance 15 is arranged is electrically connected to the blade 16 of the switch and to the end of the resistance 15 remote from the shunt field 13. The second brush 22 of the generator is connected in the usual manner to the short field and with one contact 23 of the low voltage relay 12. The output contact 24 of the low voltage relay is connected at one side of the storage battery 11 in the usual manner. The second contact of the storage battery is connected with the arm 16ª of the switch 17. A control or overcharging relay 25 is provided and includes a series of three contact plates 26, 27 and 28 operated by the armature bar and insulated one from the other. The plate 26 coacts with a pair of contacts 29 and 30, the contact 29 being electrically connected with the brush 21 and the contact 30 being connected with one end terminal 31 of the coil 32 of the relay. The coil of the relay is tapped at spaced intervals, one tap 33 spaced, for example, three turns from the terminal 31 being connected with the switch point 18, a second tap 34 spaced, for example, four turns from the terminal 31 being connected to the switch point 19 while the opposite end terminal of the winding indicated at 35 is connected to the switch board 20.

The plate 27 of the relay 25, when the relay is in operated position engages a pair of contacts 36 and 37, the contact 37 being connected with one terminal of the series winding 14 by a wire 38 while the contact 36 is electrically connected with the brush 21. The plate 28 of the relay, when in operated position, coacts with a pair of contacts 39 and 40, the contact 39 being electrically connected with the terminal 31 of the coil 32 of the relay while the contact 40 is electrically connected with the second terminal of the series field winding 14.

Assuming that the connections to be as above, the maximum charging rate of the storage battery 11 to be 18.5 and the demand upon the battery of the ignition circuit (not herein disclosed) to be one ampere while the relay 25 requires sixty ampere-turns for operation, the switch point 18 is connected with the coil 33 at a point such that between the tap 33 and terminal 31 there would be three turns. The switch point 19 is connected at such a point that between the tap 34 and terminal 31 there are four turns while the switch point 20 is connected so that the full force of the coil 32 is employed, the coil being one of thirty turns under the conditions above noted. With these connections if the switch be arranged so that the blade 16 is engaged with the point 18ª and the entire resistance 15 is thrown out of circuit the shunt field receives its maximum excitation and accordingly the generator is upon its maximum output. Assuming the low voltage relay 12 to have closed, the current is passing from the brush 21 through the switch arm 16, shunt field 13, brush 22 from the brush 22 to one side of the battery and from the brush 21 through contact 29, plate 26, contact 30, coil 32 to tap 33, contact 18 of the switch 17 through arm 16ª to the opposite side of the battery. The current thus fed as long as it remains below 19.5 amperes will not effect an operation of the relay 25 but as soon as the current reaches twenty amperes, an overcharge, the current supply is sufficient to cause an operation. Upon such operation current passes from the brush 21 to the battery as follows: To contact 36, plate 27, contact 37, series field winding 14, contact 40, plate 28, contact 39, coil 32 to tap 33, contact 18 of the switch 17 and blade 16ª to the battery. At this time the series field is in operation and the output of the generator is correspondingly reduced, reducing the charging rate to the same point or below 19.5 amperes. The operation of the switch arm 16 and 16ª upon the points 19 and 19ª and 20, 20ª is similar with the exception of the fact that there being four turns included when the switch arms connect with the points 19, 19ª the current necessary to an operation of the relay 20 will be but fifteen amperes and when the switch 17 has its arms coacting with the points 20 and 20ª there are thirty turns of the coil 32 effective, a two ampere charging rate will be sufficient to cause operation of the relay. The switch 17 thus serves the dual purpose of reducing the excitation of the shunt field winding and of lowering and regulating the charging rate at which the relay 25 or overcharging rate relay is operated. Such a switch may be conveniently arranged upon the dash of an automobile or upon the switch board of a railway train and may be readily manipulated to provide a proper charging rate under all normal conditions under the unskilled manipulation of either the operator of the vehicle or brakeman of the train as the case may be.

Since it is obvious that a system of this character is capable of considerable range of change and modification without materially departing from the spirit of my invention I do not limit myself to such specific structure except as hereinafter claimed.

I claim:—

1. A storage battery charging system including a generator having shunt and series fields, the series field being normally out of circuit, means for automatically placing the series field in circuit operated by the generator circuit and selectively variable to determine the generator output with which it operates, and means for controlling the excitation of the shunt field and a common operating member for both of said means simultaneously decreasing the excitation of the shunt field and the generator output at which the first named means is operable to place the series field in circuit.

2. A storage battery charging system including a generator having shunt and series fields, the series field being normally out of circuit, means for automatically placing the series field in circuit operated by the generator circuit and selectively variable to determine the generator output with which it operates, a resistance, a switch arm associated with the resistance for placing a predetermined portion thereof in series with the shunt field, said means for placing the series field in circuit comprising a relay the coil of which is variable, a second switch arm controlling the variations of said coil and connections between the switch arms whereby they are simultaneously movable to increase the amount of resistance inserted in the shunt circuit and the number of effective turns of the coil of the relay.

3. In a storage battery charging system, a generator having shunt and series fields, the circuit of the shunt field including a rheostat, a connection between one terminal of the generator and one terminal of the battery to be charged, a relay connected in both normal and operated positions thereof with the other terminal of the generator and in the normal position thereof connecting said terminal directly to one terminal of its coil and in the operated position thereof connecting said terminal of the generator to said terminal of the coil through the series field, said coil being variable, a switch controlling such variations, a connection between the switch and the second terminal of the battery to be charged, and operating connections between said rheostat and said switch whereby the effective size of the coil is increased as the resistance inserted in the shunt circuit is increased.

In testimony whereof I hereunto affix my signature.

DANIEL JACK GORE.